April 2, 1957          J. G. SCOTT          2,787,132
MULTI-TEMPERATURE REFRIGERATOR
Filed Oct. 13, 1954
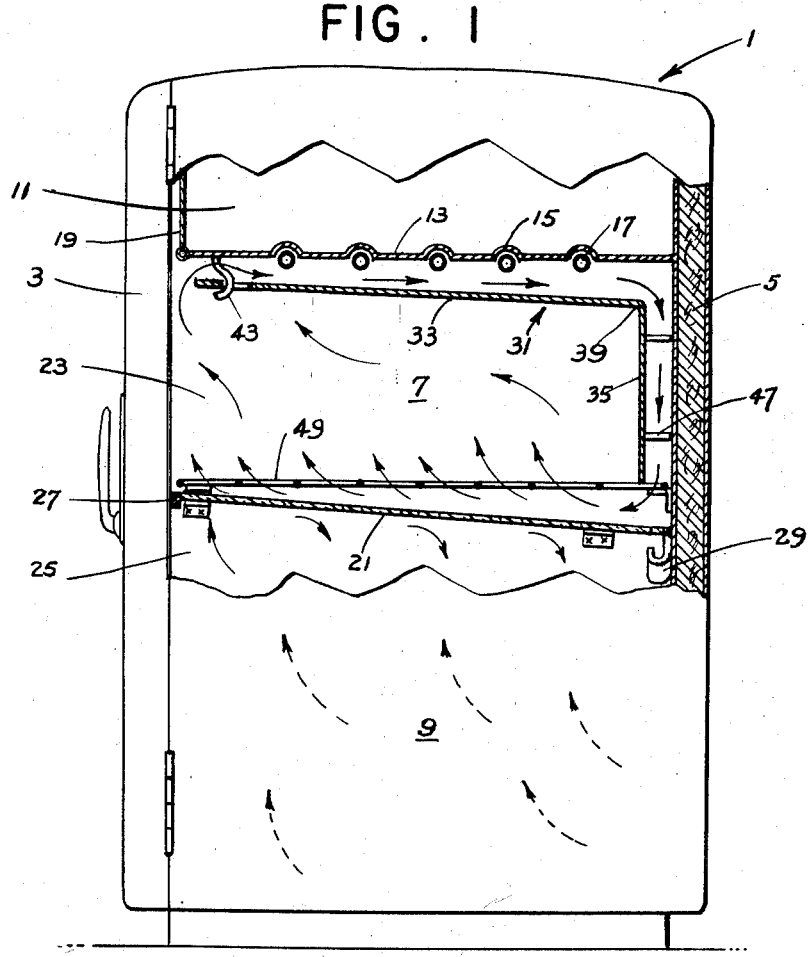
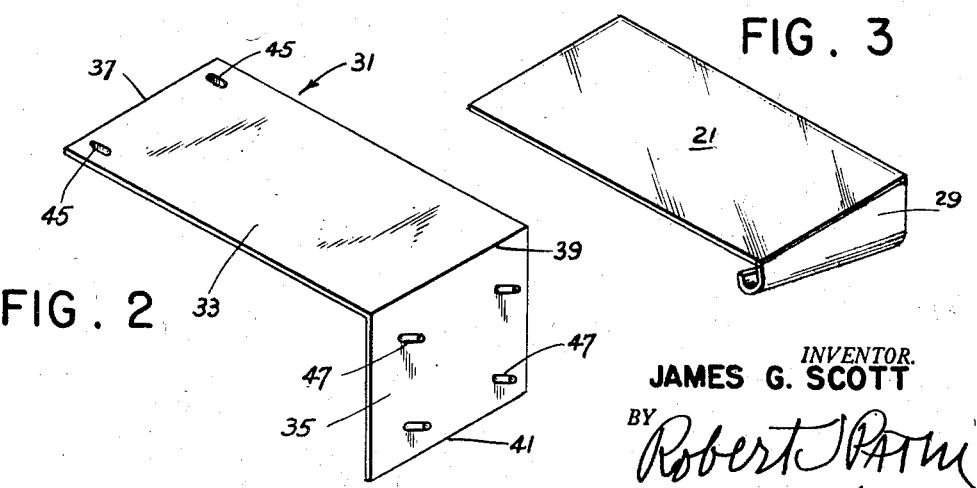
INVENTOR.
JAMES G. SCOTT
BY Robert J. Patm
ATTY

United States Patent Office 2,787,132
Patented Apr. 2, 1957

2,787,132

MULTI-TEMPERATURE REFRIGERATOR

James G. Scott, Washington, D. C.

Application October 13, 1954, Serial No. 461,989

6 Claims. (Cl. 62—103)

My invention relates to refrigerators, and more particularly to refrigerators having improved heat exchange characteristics whereby the desired temperatures may be maintained in all portions of the refrigerator and other desirable conditions of storage may be obtained.

It is essential to a complete understanding of the present invention to realize that foods and beverages fall into several categories with regard to the conditions of refrigeration under which they are stored. A first such category includes foods such as frozen and frosted foods and ice cream, which are desirably stored at temperatures not exceeding about zero degrees Fahrenheit, in order to maintain them solidly frozen and preserve them in edible condition over long periods of time. A second such category includes foods and beverages such as left over meats, milk, soft drinks and other carbonated beverages, which desirably are stored at temperatures not exceeding about 30° F. and preferably about 25° F. Finally, a third such category includes foods such as fruits and vegetables, which are desirably stored at temperatures not exceeding about 50° F., and preferably about 45° F., and which must at the same time be maintained in a moist condition to preserve their freshness. It will thus be seen that virtually all foods stored in a refrigerator fall into one of these three categories, and that each of these categories is characterized by distinctive conditions of temperature and humidity.

Heretofore, the art has endeavored to meet the storage requirements of the various types of foodstuffs outlined above by providing refrigerators having a variety of means for inducing desirable heat exchange conditions within the refrigerator. The simplest and most common of these was the ordinary ice box, in which substantially a single temperature was maintained throughout the refrigeration compartment comprising the entire interior of the box. A great improvement over the ice box was the modern refrigerator, ordinarily characterized by a freezing or evaporator unit at the top thereof for the reception of that portion of the foodstuffs which must be kept colder than the remainder of the foodstuffs. This latter arrangement provided a two-temperature refrigerator characterized by a relatively small cold compartment at the top of the refrigerator and a much larger, higher temperature compartment comprising the entire remainder of the interior of the refrigerator.

The two-temperature refrigerators described above suffered from several serious disadvantages. In the first place, if the large lower compartment were to be cooled to the desired temperature by the upper compartment or freezer unit, the temperature of the freezer unit was of necessity dropped far below the maximum temperature at which the foods contained in the freezing compartment could profitably be kept. Obviously, this situation resulted in great power losses and increased expense of operation and a shorter working life of the refrigerator. Inasmuch as the difficulty with which the lower compartment could properly be cooled was largely due to poor circulation of air within the lower compartment, it was proposed to install fans within the lower compartment to improve the circulation of the air. However, by mechanical agitation of the air in this manner, it was still impossible to obtain a desired flow of air such as would induce proper heat exchange. Moreover, if the refrigerator were maintained at a temperature sufficiently low to keep left over meat and milk and the like, fresh fruits and vegetables placed in the lower compartment would quickly harden and dry out and become otherwise unusable, due in part to the low temperature and in part to the fact that the moisture in such fruits and vegetables would quickly pass into the dry air and condense out on the freezer unit thus leaving the fruits and vegetables dehydrated.

In an effort to remedy the drawbacks of the two-temperature refrigerator, it was proposed to provide a fruit and vegetable storage bin adjacent the bottom of the refrigerator and comprising a storage space sealed off from the rest of the refrigerator. Although this type of bin was effective to prevent excessive dehydration of the foods stored therein, a new difficulty arose in that it was impossible to drop the temperature of this bin within the desired temperature range, that is, a temperature about 20° F. above the temperature of the middle compartment between the bin and the freezer unit. If the bin took the form merely of a storage box within the lower compartment, then it quickly reached the temperature of the lower compartment, which was too low for the storage of fresh fruits and vegetables. If on the other hand the bin were sealed off from the upper compartment by a plate in sealing engagement with all the side walls of the refrigerator and the lowermost compartment thus formed cooled merely by heat exchange between the lowermost compartment and the middle compartment, then it was heretofore impossible to lower the temperature in this lowermost compartment to about 50° F. or less without greatly overcooling the two upper compartments and thus greatly overworking the refrigerator.

Accordingly, although a number of other attempts were made to overcome the foregoing difficulties and disadvantages of the prior art refrigerators, none, so far as I am aware, was entirely successful when carried into practice on a commercial scale.

Hence, it is an object of the present invention to provide a refrigerator having improved heat exchange characteristics such that desirable temperatures may be maintained in all portions of the refrigerator.

Another object of the invention is the provision of a refrigerator in which separate categories of food may be maintained under the various conditions of refrigeration best suited to their preservation.

The invention also contemplates the provision of a refrigerator of such improved thermal efficiency that each category of food is maintained at no lower a temperature than is necessary.

It is a further object of the invention to provide a refrigerator in which optimum circulation of air is obtained without the aid of moving parts.

A still further object of the invention is the provision of a refrigerator in which the aforesaid and other desirable characteristics are obtained by very simple modifications of existing refrigerator structure, such as might be performed by any home mechanic.

The invention also contemplates a refrigerator which is simple in construction, easy to clean and maintain, and economical in manufacture and operation.

Other objects and advantages will become apparent from the following description taken in conjunction with the accompanying drawings, in which:

Figure 1 is a side elevational view, partly in section, of a refrigerator according to the present invention.

Figure 2 is a perspective view of a baffle forming a portion of the present invention, as seen detached from its assembled position of Figure 1.

Figure 3 is a perspective view of a heat exchange wall according to the invention, seen removed from its assembled position in Figure 1.

Broadly stated, the present invention contemplates the provision of a refrigerator comprising a plurality of walls defining a compartment of which the ceiling includes refrigerating means for cooling said compartment and which includes baffle means below the ceiling adapted to cause unidirectional flow of air within said lower compartment along the bottom surface of said ceiling, whereby improved heat transfer between the lower compartment and the ceiling is obtained.

Referring now to the drawings, Figure 1 shows a side elevational view of a refrigerator 1 according to the invention, which comprises a conventional horizontally swinging door 3 hinged at one side to refrigerator 1, and provided with insulating material of substantial thickness, an insulated rear wall 5, insulated side walls 7 and 9, and insulated top and bottom walls (not shown). Thus, door 3, rear wall 5 and side walls 7 and 9 comprise the side walls of the refrigerator.

Adjacent the top of refrigerator 1 is a refrigerating compartment or evaporator or freezer unit 11 of conventional construction, which extends all the way across the refrigerator from side wall 7 to side wall 9. The freezer unit 11 is separated from the rest of the refrigerator chamber by a generally horizontal bottom wall 13 provided with transverse indentations 15 for the reception of cooling coils 17 in the conventional manner. Bottom wall 13 extends substantially all the way across the refrigerator from side wall 7 to side wall 9 and forms a floor for refrigerating compartment 11 and a ceiling for that portion of the refrigerator chamber which is below the refrigerating compartment. Access to freezer unit 11 may be had through door 19, which swings downwardly outwardly in the usual manner.

Disposed a substantial distance below the refrigerating compartment is a heat exchange wall 21, which divides the remainder of the refrigerator chamber into a middle compartment 23 above wall 21 and a lower compartment 25 below wall 21. Wall 21 may desirably be made of glass and extends from side wall 7 to side wall 9 in sealing engagement with both. Thus, wall 21 forms a floor for compartment 23 and a ceiling for compartment 25. Deformable sealing or gasket means 27 are provided at the forward or front edge of wall 21 to seal against door 3 when the latter is closed. Wall 21 is also in sealing engagement with rear wall 5, and is provided adjacent the lower surface of its rear edge with a drip or drain trough 29 which inclines downwardly, as shown in Figures 1 and 3. Hence, it will be obvious that wall 21 is in sealing engagement with all the adjacent side walls of the refrigerator and serves to seal off compartment 25 from compartment 23. Wall 21 is also inclined downwardly rearwardly from its highest edge adjacent door 3 to its lowest edge adjacent rear wall 5.

Removably mounted within compartment 23 is a generally L-shaped baffle means indicated generally at 31. Baffle 31 comprises a first plate 33 forming one leg of the L and a second plate 35 forming the other leg of the L. Plates 33 and 35 extend substantially from side wall 7 to side wall 9. Plate 33 is spaced below bottom wall 13 and cooling coils 17 of the refrigerating compartment and is inclined downwardly rearwardly from a highest point adjacent forward and upper edge 37 to a lowest point adjacent lower and rear edge 39 thereof. Upper edge 37 is spaced from door 3; and lower edge 39 is spaced from rear wall 5. Second plate 35 is spaced from and generally parallel to rear wall 5, and extends generally vertically downward to a lower terminal edge 41 which is spaced above wall 21.

Baffle 31 may be formed of a single sheet of material bent as at 39, and may be supported at its forward end by hooks 43 depending from adjacent wall 13 which may be received through slots 45 in plate 33 adjacent edge 37. Baffle 31 may be spaced from rear wall 5 the desired distance by means of pegs or nipples 47 on plate 35 adapted to contact rear wall 5. Baffle 31 may be supported on its lower edge 41, which may rest on a removable grid-like shelf or grating 49 of conventional construction. It will be understood that other methods and means for suspending or supporting baffle 31 in its desired spaced relationship may be used. However, it will be appreciated that baffle 31 is desirably removable for purposes of defrosting the refrigerator and for purposes of cleaning otherwise inaccessible surfaces of the baffle and of rear wall 5.

The emplacement of the removable parts may proceed as follows: With baffle 31 and grating 49 removed, the latter is first inserted in generally horizontal position on its conventional brackets for the purpose of providing a horizontal, level shelf in compartment 23 for the reception of bottles, bowls and the like. Baffle 31 is then inserted above shelf 49, rear end first, and the forward or outer end thereof raised so that hooks 43 pass downward through slots 45. The baffle may then be pushed rearwardly until it seats completely, with hooks 43 engaging under the front portion thereof, nipples 47 engaging against rear wall 5, and lower edge 41 resting on grating 49.

The function of my novel refrigerator is as follows: Refrigerant passing through cooling coils 17 absorbs heat from freezer unit 11, until the temperature in this refrigerating compartment drops to about zero degrees Fahrenheit or below. Such temperature is suitable for prolonged storage of frozen meats and other frozen foods and frozen beverages, ice cream, and the like. The temperature of cooling coils 17 and lower wall 13 is thus substantially lower than the temperature of compartment 23, with the result that the air adjacent the under side of the freezing unit becomes cooler, denser, and tends to fall. However, air falling from adjacent the freezer unit strikes the upper surface of plate 33 of baffle 31, and moves by gravity downwardly rearwardly along the incline of plate 33 toward rear wall 5. At this point, the air, following the only available passage, passes between lower edge 39 of plate 33 and rear wall 5, and passes generally vertically downward between plate 35 and rear wall 5, in the direction of and toward plate 21. This flat, vertical descending stream of air strikes wall 21 adjacent the upper surface of the lower rear edge thereof, and is pushed by the air behind it forwardly along the upper surface of wall 21, in the direction of the arrows as seen in Figure 1. However, the air emerging from between plate 35 and rear wall 5 tends to cling to the upper surface of wall 21 because it is colder and heavier than the remainder of the air in compartment 23.

Just as the air in compartment 23 was warmer than the cooled air stream, so also the air in compartment 25 is warmer than the cooled air descending between plate 35 and rear wall 5. Thus, when this descending cooled air strikes the rear portion of wall 21 adjacent drain trough 29, this rear portion of wall 21 is cooled, and cools the air in compartment 25 adjacent its lower surface in this rear region. This cooled air in compartment 25 at the rear thereof falls under the influence of gravity and spreads out along the floor of compartment 25, necessarily in a forward direction, that is, toward the left as seen in Figure 1. This movement of cold air to the bottom of compartment 25 necessarily forces warmer air to the top of compartment 25, against the lower surface of wall 21. Heat from this warmer air passes through wall 21 and into the stream of cooled air which is moving toward the front of the refrigerator along the upper surface of wall 21. As this cooled air receives the heat, it becomes somewhat warmer than the air behind it and tends to rise upwardly to the left, as seen in Figure 1 and there shown by the arrows in compartment 23. This rising air then passes between door 3 and forward edge 37 of plate 33 to pass again between plate 33 and freezer unit 11, become cooled, and repeat the cycle.

In the meantime, the fall of air adjacent the rear of compartment 25 and forward movement thereof along the bottom of the compartment has induced circulation of air in compartment 25 in a clockwise direction, as seen in Figure 1. It should be noted that initial impingement of the descending air in compartment 23 causing downward flow of air adjacent the ear of compartment 25 has been sufficient to fix the direction of flow in compartment 25. Thus, in effect, the flow of air in compartment 23 assures that the air in compartment 25 will flow in the same direction. The advantages of this are manifest, for not only will improved heat exchange occur due to better air circulation, but also the heat exchange characteristics at all points along wall 21 will be at their best. This latter advantage follows from the fact that the air adjacent the upper surface of wall 21 is coldest at the rear thereof and gradually progressively warmer toward the front thereof as it moves to the left as seen in Figure 1 and absorbs heat from wall 21. At the same time, the air adjacent the lower surface of wall 21 is warmest at the front or forward end thereof and becomes progressively gradually cooler as it moves to the right as seen in Figure 1 and gives up heat to wall 21. Thus, it will be obvious that the temperature differential between the upper and lower surfaces of wall 21 at any point thereon tends to remain more uniform from front to rear of wall 21 than would be the case if any other pattern of air flow were established; and it is well known that the most constant temperature differential along a heat exchange member assures the greatest efficiency of heat exchange. Hence, I have achieved desirable air flow and maximum heat exchange efficiency in my entire refrigerator merely by the insertion of a stationary baffle in one compartment thereof.

It should also be noted that baffle means 31 approximates the square shape of bottom wall 13 of freezer unit 11 and rear wall 5, and therefore does not substantially alter the shape of compartment 23 nor substantially decrease the capacity of that compartment. The air passage space defined above and to the rear of baffle 31 is ordinarily waste space in a refrigerator; and the installation of baffle 31 merely puts this waste space to good use. Similarly, with regard to wall 21, it should be noted that the downwardly rearward inclination of this wall not only permits the water which condenses thereon from compartment 25 to run down the wall rearwardly to drain trough 29 and thus avoid dripping on the food in compartment 25, but also this downward inclination turns the wall more into parallelism with the normal course of flow of the streams of air on either side thereof and thus improves the heat exchange qualities of the wall. Moreover, the fact that the wall 21 may be of glass enables the illumination both of compartment 23 and of compartment 25 by means of light only in compartment 23. Finally, the fact that wall 21 is sealed from compartment 23 assures that moisture in the foodstuffs in compartment 25 will not condense out on the freezer unit as frost, thus decreasing the heat absorption of the freezer unit from the other compartments, and also insures that the foodstuffs in compartment 25 will not become dehydrated.

Thus, it will be seen that I have provided a novel and improved refrigerator, adapted to maintain three separate temperatures falling within highly desirable temperature ranges by virtue of greatly increased heat exchange efficiency, characterized in that the middle compartment is a heat absorption medium for the lower compartment and that the upper compartment is a heat absorption medium for the middle compartment, and in which the desirable heat exchange characteristics are obtained by the employment of a single stationary baffle means. It will also be apparent that I have provided a novel and improved refrigerator in which a lower compartment sealed off from the middle compartment is maintained as a humid compartment whereby excessive loss of moisture from foodstuffs stored in said humid compartment is avoided. Moreover, it will be appreciated that a refrigerator according to the present invention is simple to construct, rugged and durable in operation, easy to clean, and economical to use.

Finally, it will be seen that I have provided a three-temperature refrigerator comprising a plurality of walls defining a chamber, refrigerating means defining a lowest-temperature compartment adjacent the top of the chamber, a heat exchange wall defining a highest-temperature compartment adjacent the bottom of the chamber and a middle-temperature compartment between the highest and lowest-temperature compartments, and baffle means within the middle temperature compartment, the baffle means including a first plate spaced below the refrigerating means and inclined from the horizontal and spaced from first and second opposite side walls of the compartment at the lower and upper edges of the plate, respectively, the baffle means further including a second plate spaced from and substantially parallel to the first side wall and extending downwardly from adjacent the lower edge of the first plate and terminating in a lower terminal edge short of the heat exchange wall, whereby air cooled by the refrigerating means will move downward along the incline of the first plate, pass between the lower terminal edge of the first plate and the first side wall, move downward between the first side wall and the second plate, pass between the lower terminal edge of the second plate and the heat exchange wall, circulate through the compartment, and pass between the upper terminal edge of the first plate and the second side wall to repeat the cycle.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A multi-temperature refrigerator comprising a plurality of walls defining a chamber, refrigerating means defining a relative low temperature compartment adjacent the top of said chamber, a heat exchange wall defining a relatively high temperature compartment adjacent the bottom of said chamber and a middle-temperature compartment between said high and low-temperature compartments, and baffle means within said middle-temperature compartment including a plate spaced below said refrigerating means and inclined from the horizontal and spaced from first and second opposite side walls of said compartment at the lower and upper edges of said plate, respectively, whereby air cooled by said refrigerating means will move downward along the incline of said plate, pass between the lower terminal edge of said plate and said first side wall, move down said first side wall, circulate through said compartment, and pass between the upper terminal edge of said plate and said second side wall to repeat the cycle, said heat exchange wall being inclined from the horizontal, whereby unidirectional flow of air within said high temperature compartment is induced.

2. The invention of claim 1, in which said heat exchange wall is inclined in the same direction as said plate.

3. The invention of claim 2, in which the front wall of said refrigerator comprises a door and in which said plate and said heat exchange wall are inclined downwardly rearwardly.

4. A multi-temperature refrigerator comprising a plurality of walls defining a chamber, refrigerating means defining a relatively low-temperature compartment adjacent the top of said chamber, a heat exchange wall defining a relatively high-temperature compartment adjacent the bottom of said chamber and a middle-temperature compartment between said high and low-temperature compartments, and baffle means within said middle-temperature compartment, said baffle means including a first plate spaced below said refrigerating means and inclined from the horizontal and spaced from first and second opposite side walls of said compartment at the lower and upper edges of said plate, respectively, said baffle means further including a second plate spaced from and substantially parallel to said first side wall and extending downwardly from adjacent said lower edge and terminating in a lower terminal edge short of said heat exchange wall, whereby air cooled by said refrigerating means will move downward along the incline of said first plate, pass between the lower terminal edge of said first plate and said first side wall, move downward between said first side wall and said second plate, pass between the lower terminal edge of said second plate and said heat exchange wall, circulate through said compartment, and pass between the upper terminal edge of said first plate and said second side wall to repeat the cycle, said heat exchange wall being inclined from the horizontal, whereby unidirectional flow of air within said high-temperature compartment is induced.

5. The invention of claim 4, in which said heat exchange wall is inclined in the same direction as said first plate.

6. The invention of claim 5, in which the front wall of said refrigerator comprises a door and in which said first plate and said heat exchange wall are inclined downwardly rearwardly.

References Cited in the file of this patent

UNITED STATES PATENTS

| | | |
|---|---|---|
| 1,734,127 | Hamilton | Nov. 5, 1929 |
| 1,734,366 | Corneil | Nov. 5, 1929 |
| 2,089,961 | Hull | Aug. 17, 1937 |
| 2,098,155 | Minana | Nov. 2, 1937 |
| 2,275,324 | Scott | Mar. 3, 1942 |
| 2,292,032 | Atchison | Aug. 4, 1942 |
| 2,297,581 | Peltier | Sept. 29, 1942 |
| 2,304,411 | Keighley | Dec. 8, 1942 |
| 2,345,453 | Brace | Mar. 28, 1944 |
| 2,665,567 | King | Jan. 12, 1954 |
| 2,694,297 | Shoemaker | Nov. 16, 1954 |